Jan. 12, 1932.    W. A. CHRYST    1,840,700
SHOCK ABSORBER
Filed Sept. 16, 1929    2 Sheets-Sheet 1

Inventor
William A. Chryst
By
Spencer, Hardman and Fehr
His Attorneys

Patented Jan. 12, 1932

1,840,700

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed September 16, 1929. Serial No. 392,894.

This invention relates to improvements in shock absorbers particularly adapted to control vehicle spring movements.

It is among the objects of the present invention to provide a shock absorber of simple structure and design, so constructed and arranged that it will permit free action of the springs within a limited range, the more extended action of the vehicle springs, however, being cushioned substantially to prevent jars and jolts from being transmitted to the frame of the vehicle while said vehicle is being operated over a rough roadbed.

Further objects and advantages of the present invention will be apparent from the following description, reference being had to the accompanying drawings, wherein a preferred embodiment of one form of the present invention is clearly shown.

Figure 1:
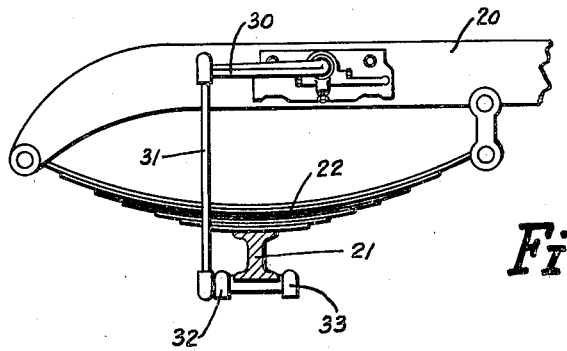
Fig. 1 is a side view of the front portion of a vehicle chassis, a shock absorber embodying the present invention being shown applied thereto.

Referring to the drawings, the frame of the vehicle is designated by the numeral 20, said frame being supported upon the axle 21 of the vehicle by springs 22, only one of which is shown. For the sake of clearness the road wheels supported on the axle 21 have not been shown.

The shock absorber comprises a casing 23 presenting a fluid reservoir 24 and a cylinder 25 in communication with said fluid reservoir. Each end of the cylinder 25 is provided with a screw plug 26 which completely closes and seals these open ends of the cylinder.

Figure 4:
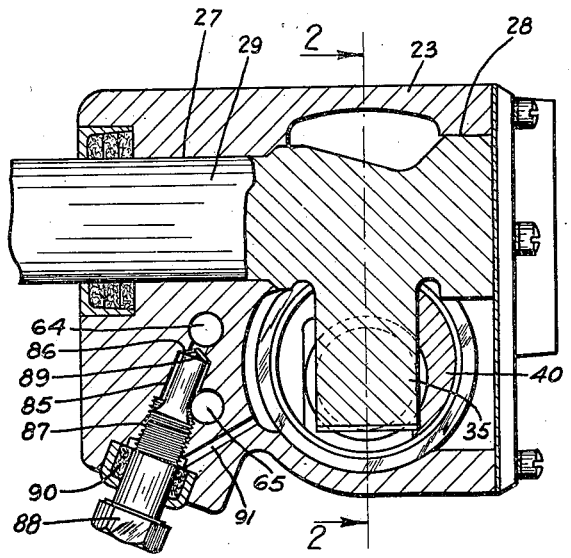
Fig. 4 is a transverse sectional view taken along the line 4—4 of Fig. 3.

As shown in the Fig. 4, casing 23 provides bearing portions 27 and 28 in which the rocker shaft 29 is journalled. One end of the rocker shaft extends to the outside of the casing 23, this end being provided with the shock absorber operating arm 30. The free end of arm 30 is connected to one end of a link 31, the other end of said link being connected to a bracket 32 which is anchored to the axle 21 by a clamping member 33. The rocker shaft 29 has an arm 35 extending therefrom into the cylinder 25 of the casing, the free end of the arm 35 having rounded cam faces 36 and 37. Within the cylinder 25 there is provided a piston 40 comprising two head portions 41 and 42, which form compression chambers 43 and 44 respectively at the opposite cylinder ends.

Figure 2:
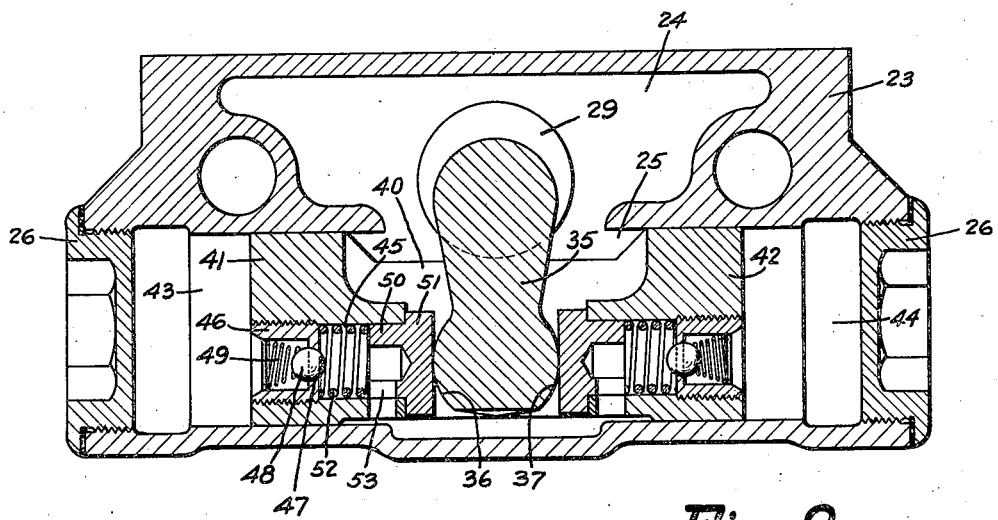
Fig. 2 is a sectional view taken along the line 2—2 of Fig. 4.
Figure 5:
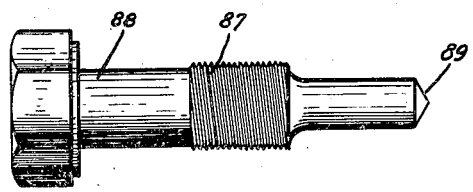
Fig. 5 is a detail view illustrating the metering pin.

Referring to Fig. 2, the piston head portion 41 is provided with a passage 45, the axis of which is substantially parallel to the axis of the cylinder 25. One end of this passage is screw-threaded for receiving the valve cage 46. Valve cage 46 provides a valve seat 47 against which a ball check valve 48 is normally, yieldably urged by the spring 49 supported within the valve cage 46. Into the end of the passage 45 opposite the valve cage 46 there extends the shank portion 50 of the wear piece 51. A spring 52 interposed between the valve cage 46 and the wear piece 51 yieldably urges said wear piece into engagement with the circular face or cam surface 36 of the arm 35 whereby any wear of either the wear piece 51 or the cam surface 36 of the arm 35 will automatically be taken up. A transverse passage 53 formed by transverse aligned openings in the piston head portion 41 and the shank 50 of the wear piece provides communication between the fluid reservoir 24 and the check valve 48. Inasmuch as piston head 42 is provided with a valve structure similar to that provided in the piston head 41, no detailed description thereof will be made. These valve structures are provided for purposes of replenishing the fluid supply within the compression chambers, thus compensating for any fluid leaks from said chambers past the respective pistons or from any point that should be absolutely sealed, but which, through wear, might develop a leak.

The shock absorber comprises a series of independent valve chambers 60 and 61 having valve seats 62 and 63 respectively. Valve chamber 61 is in communication with the compression chamber 43 through a channel 64. The valve chamber 60 with its seat 62 is in communication with the compression chamber 44 through the channel 65. A duct 66 leads from the valve chamber 60 to the channel 64. A similar duct 67 leads from the valve chamber 61 to the channel 65. Each valve chamber 60 and 61 respectively is provided with a pressure relieving valve; both of them being exactly alike, only one will be described for the sake of brevity.

Figure 3:
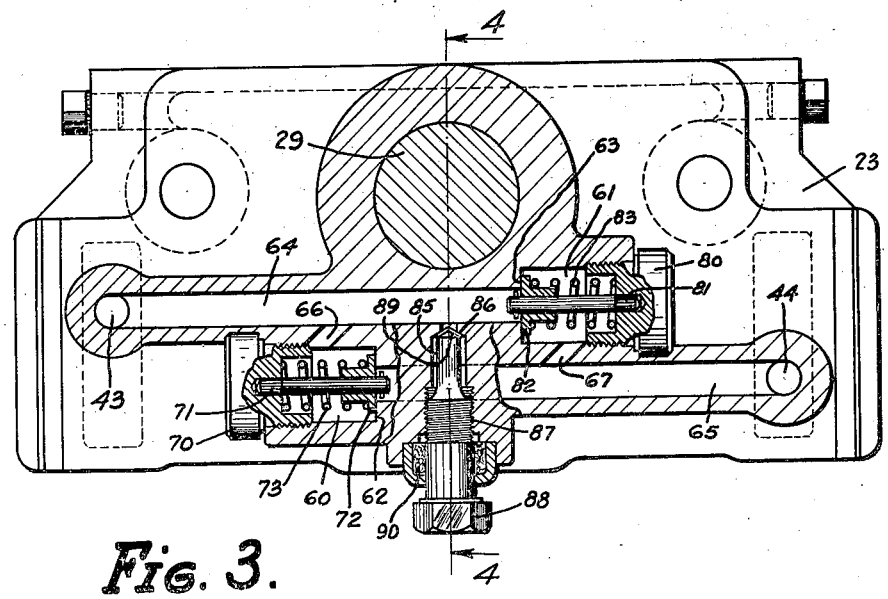
Fig. 3 is a sectional view showing the fluid flow controlling mechanism of the device.

Referring to the Fig. 3, the outer end of the valve chamber 60 is provided with screw threads for receiving the screw plug 70, having a gasket substantially to prevent leaks. The valve pin 71 is carried by the screw plug 70, said valve pin being mounted in such a manner and being of sufficient length so that when the screw plug is fitted into the valve chamber 60, said pin will extend into the passage 65 communicating with the valve seat 62. The diameter of the pin 71 is substantially less than the transverse dimension of the channel 65. A valve 72 is slidably supported upon the vave pin 71 and is urged into engagement with the valve seat 62 by a spring 73 interposed between the screw plug 70 and the valve 72. Thus valve 72 yieldably urged against the valve seat 62 normally cuts off communication between the channel 65 and the valve chamber 60. The pressure relief valve for the valve chamber 61 comprises a screw plug 80 carrying the valve pin 81 which slidably supports a valve 82 urged into seating engagement by a spring 83. Valve 82 normally cuts off communication between the channel 64 and the valve chamber 61.

As shown in Figs. 3 and 4, channels 64 and 65 are brought into direct communication adjacent their point of entries to their respective valve chambers 61 and 60 by a passage 85 which is provided with an angular valve seat portion 86. Passage 85 extends to the outside of the shock absorber, the outer portion of said passage having screw threads 87 for receiving the screw-threaded shank portion of an adjustable metering pin 88. The metering pin has a tapered end portion 89 which may be brought into proper proximity to the valve seat 86 in order to provide a desirable, constant restriction to the flow of fluid through the passage 85. A packing 90 around the pin substantially eliminates leakage at this point. A return duct 91 leading from the screw-threaded portion 87 of the passage 85 back to the fluid reservoir 24 will direct fluid passing along the screw threads 87 back to the reservoir 24 and thus substantially prevent the fluid from even reaching the packing around the metering pin 88. The metering pin 88 extending outside of the shock absorber renders this pin accessible from without the shock absorber for adjusting purposes so that, if desired, the gap between the tapered end 89 of the metering pin and the seat 86 in the passage 85 may be varied to increase or decrease the flow of fluid and thus to vary the effect of the shock absorber.

The device operates in the following manner:

When the road wheels, not shown, strike an obstacle in the roadway, vehicle springs 22 are flexed toward the frame 20, consequently link 31 will rotate the arm 30 clockwise, which results in a clockwise rotation of arm 35 within the shock absorber. This movement of the arm 35 results in a movement of the piston 40 toward the left as regards Fig. 2 and thus the fluid within the compression chamber 43 will have pressure exerted thereupon, causing it to be ejected into the channel 64 from whence the fluid will flow through the passage 85 past the metering pin portion 89 into the channel 65 and thence into the compression chamber 44. Slight flexing of the springs 22 will not force sufficient fluid through passage 85 to cause the metering pin to restrict the flow and thus effect a resisting effort by the shock absorber. However, if more extended flexing movements of the spring obtain, then the gap between seat 86 and the tapered end 89 of the metering pin will restrict the flow through passage 85 and cause the movement of the piston to be resisted. If the pressure cannot be sufficiently relieved by the gap mentioned, then the excessive pressure will be exerted upon valve 82 to move said valve from its seat 63 and thus will be established another flow of fluid from the channel 64 past valve 82 into the valve chamber 61, thence through duct 67, channel 65, into the other compression chamber 44. The valve 82 will thus offer restriction to the flow of fluid in accordance with the pressure exerted within the compression chamber 43.

As soon as the springs 22 have reached the limit of their flexure caused by certain obstructions being met in the roadway, the tendency of the springs is to return to normal unflexed position with a sudden, rebounding movement which, if permitted, will result in undesirable shocks and jars being transmitted to the frame of the vehicle. The device operates to check or cushion the return movement of the springs toward normal, unflexed position. As the springs so move, the link connection 31 will operate the shock absorber operating arm 30 and thus the arm 35 within the shock absorber in a counter-clockwise direction, resulting in the movement of the piston 40 to the right as regards Fig. 2. Pressure now being exerted upon the fluid within the compression chamber 44 will force said fluid through the channel 65 against the valve 72. As long as the pressure is insufficient to move valve 72 against the effect of spring 73, the pressure relieving flow follows from duct 65 into passage 85, past the metering pin portion 89 into the channel 64 and thence into the opposite compression chamber 43. When the fluid pressure reaches a proper value so that the passage 85 cannot properly relieve it, valve 72 will be moved from its seat 62 and a second flow established from the channel 65 through valve chamber 60, duct 66 to channel 64. In this case also, like in the case of the valve 82, valve 72 will restrict the flow of fluid in accordance with the fluid pressure in channel 65. From this it may be seen that pressure is exerted on the pressure side of one valve and simultaneously on the relief side of the other, thus tending to open the first and to more tightly close the second.

The fluid flow capacity of the passage 85 is controlled by the adjustment of the metering pin 88 which, if screwed into the passage, will more greatly restrict the flow of fluid through the passage, while if it is desired to reduce the restriction, then the metering pin is screwed out of the passage. Increasing the restriction to the flow of fluid by adjusting the metering pin, or by inserting springs of greater tension in lieu of springs 73 and 83, will result in a stiffer ride, while the unscrewing of the metering pin 88 or insertion of weaker springs for the springs 73 and 83 will provide for a more flexible ride, or freer spring action.

While the form of embodiment of the present invention as herein disclosed, constitutes a preferred form, it is to be understood that other forms might be adopted, all coming within the scope of the claims which follow.

What is claimed is as follows:

1. A shock absorber comprising a series of independent valve chambers having valve seats; separate channels communicating with said valve seats; a duct leading from each respective valve chamber to the channel communicating with the valve seat of the other valve chamber; a valve in each valve chamber, yieldably seated upon the valve-seat thereof; and a constantly restricted passage connecting the said channels.

2. A shock absorber comprising a series of independent valve chambers having valve seats; separate channels communicating with said valve seats; a duct leading from each respective valve chamber to the channel communicating with the valve seat of the other valve chamber; a valve in each valve chamber, yieldably seated upon the valve-seat thereof; a passage connecting the said channels; and a metering pin extending into said passage for restricting the flow of fluid therethrough.

3. A shock absorber comprising a series of independent valve chambers having valve seats; separate channels communicating with said valve seats; a duct leading from each respective valve chamber to the channel communicating with the valve seat of the other valve chamber; a valve in each valve chamber, yieldably seated upon the valve-seat thereof; a passage connecting the said channels; and an adjustable metering pin accessible from outside the shock absorber and extending into said passage for providing a constant restriction to the flow of fluid through said passage.

4. A shock absorber comprising a pair of valve chambers having valve seats; channels into which said valve seats open; ducts leading from the relief side of the respective valve seats to the channel opening into the other of said valve seats; valves yieldably urged into engagement with the said valve seats; and a constantly restricted passage connecting the two channels.

5. A shock absorber comprising a pair of valve chambers having valve seats; channels into which said valve seats open; ducts leading from the relief side of the respective valve seats to the channel opening into the other of said valve seats; valves yieldably urged into engagement with the said valve seats; a passage connecting the channels on the pressure side of the valves respectively; and a metering pin extending into the passage, constantly restricting the flow of fluid therethrough.

6. A shock absorber comprising a cylinder having a pair of channels communicating therewith; a pair of valve chambers having valve seats opening into said channels respectively; ducts extending from the relief sides of said valve seats respectively to the pressure sides of the other of said seats; valves yieldably urged upon said seats; a passage connecting the channels substantially adjacent the pressure sides of the respective valve seats; and means extending into said passage, constantly to restrict the flow of fluid therethrough.

7. A shock absorber comprising a cylinder having a pair of channels communicating therewith; a pair of valve chambers having valve seats opening into said channels respectively; ducts extending from the relief sides of said valve seats respectively to the pressure sides of the other of said seats; valves yieldably urged upon said seats; a passage connecting the channels substantially adjacent the pressure sides of the respective valve seats; and means extending into said passage, constantly to restrict the flow of fluid therethrough, said means being accessible from without the shock absorber for adjusting the restriction to the flow of fluid through said passage.

8. A shock absorber comprising a cylinder, a piston in said cylinder forming a compression chamber at each end thereof; an automatic relief valve for each compression chamber for controlling the fluid pressure therein; a duct leading from the relief side of each relief valve to the pressure side of the other valve; a passage providing direct communication between the pressure sides of both valves, and a fluid flow restricting pin extending into said passage.

In testimony whereof I hereto affix my signature.

WILLIAM A. CHRYST.